United States Patent [19]

Shinohara et al.

[11] Patent Number: 5,601,260
[45] Date of Patent: Feb. 11, 1997

[54] ENGAGING STRUCTURE OF RETAINER

[75] Inventors: Katsuyoshi Shinohara, Hirakata; Takahiko Inari, Osaka, both of Japan

[73] Assignees: NIFCO, Inc; Matsushita Electric Industrial Co. Ltd., both of Japan

[21] Appl. No.: 437,387

[22] Filed: May 11, 1995

[30]  Foreign Application Priority Data

May 27, 1994  [JP]  Japan ..................... 6-115394

[51] Int. Cl.$^6$ ........................................ F16L 3/22
[52] U.S. Cl. .................. 248/68.1; 248/71; 248/73; 248/74.2; 411/508; 411/913
[58] Field of Search ................. 248/68.1, 71, 73, 248/74.2, 74.1, 62; 411/508, 509, 510, 913

[56]  References Cited

U.S. PATENT DOCUMENTS

| | | | |
|---|---|---|---|
| 3,529,795 | 9/1970 | Van Niel | 248/71 |
| 3,777,052 | 12/1973 | Fegen . | |
| 3,991,960 | 11/1976 | Tanaka | 248/73 X |
| 4,143,577 | 3/1979 | Eberhardt | 248/71 X |
| 4,635,326 | 1/1987 | Yagi | 411/508 X |
| 4,655,424 | 4/1987 | Oshida | 248/68.1 X |
| 4,669,688 | 6/1987 | Itoh | 248/71 X |
| 4,700,913 | 10/1987 | Hirano | 248/73 |
| 4,795,116 | 1/1989 | Kohut et al. | 248/73 |
| 4,890,805 | 1/1990 | Morita | 248/74.2 |
| 5,012,995 | 5/1991 | Ward | 248/68.1 |
| 5,035,560 | 7/1991 | Watanabe et al. . | |
| 5,039,040 | 8/1991 | Idjakiren | 248/73 |
| 5,324,151 | 6/1994 | Szudarek et al. . | |
| 5,333,822 | 8/1994 | Benoit | 248/71 |

FOREIGN PATENT DOCUMENTS

| | | |
|---|---|---|
| 2536237 | 5/1984 | France . |
| 3230852 | 3/1983 | Germany . |
| 52-74497 | 6/1977 | Japan . |
| 55-54125 | 12/1980 | Japan . |
| 58-158490 | 10/1983 | Japan . |
| 59-29478 | 2/1984 | Japan . |
| 5-47846 | 12/1993 | Japan . |
| 1075301 | 7/1967 | United Kingdom . |
| 1421167 | 4/1973 | United Kingdom . |
| 1397553 | 3/1975 | United Kingdom . |
| 2130805 | 6/1984 | United Kingdom . |
| 2289714 | 11/1995 | United Kingdom . |

*Primary Examiner*—Derek J. Berger
*Attorney, Agent, or Firm*—Parkhurst, Wendel & Burr, LLP

[57]  ABSTRACT

An engaging structure of a flexible retainer which includes a retaining portion for retaining a member to be retained and which retains the member to be retained at a mounting plate by engaging the retaining portion with a mounting hole formed at a mounting plate, comprising: a pair of leg pieces which are inserted through the mounting hole; a pair of pawl pieces which are provided at an anchor portion to which distal ends of the pair of leg pieces are connected and which are inserted through the mounting hole so as to elastically abut a back surface of the mounting plate; and elastic plates which are provided in pairs so as to oppose the pawl pieces and elastically contact the surface of the mounting plate. Because the elastic plates urge the anchor portion in a direction of withdrawing the anchor portion, the engaging structure of the retainer can conform to changes in the thickness of the mounting plate. Moreover, against the force which pulls the anchor portion out of the mounting hole due to the inclination of the retainer, the pawl pieces are pressed and expanded so as to widely abut the back surface of the mounting plate. Accordingly, the withdrawal of the anchor portion is prevented.

17 Claims, 14 Drawing Sheets

5,601,260

ENGAGING STRUCTURE OF RETAINER

BACKGROUND OF THE INVENTION

1. Field of the Invention

The present invention relates to an engaging structure of a retainer for engaging a retainer or holder, which retains or holds a coil or the like, with a mounting plate.

2. Description of the Related Art

In general, it is desired that an engaging structure of a retainer, which retains a cable, a coil or the like, is firmly engaged with a mounting plate and can conform to changes in the thickness of the mounting plate. It is also desirable that the engaging structure is difficult to withdraw from a mounting hole and can conform to changes in the diameter of the mounting hole. Further, an anchor portion which does not move with play is desired.

However, as a degaussing coil wound around an outer periphery of a cathode-ray tube, for example, a coil clamp is mounted to a bracket of the cathode-ray tube in advance as a retainer, and thereafter, the degaussing coil is inserted into a clamp portion of the coil clamp. If this type of operation is taken, the coil clamp needs to be inclined. Accordingly, it is desirable that the anchor portion of the coil clamp can be inclined and is difficult to withdraw from the bracket.

It is also considered to apply conventional structures to the engaging structure of the coil clamp.

For example, in an engaging structure of a retainer or holder 76 shown in FIG. 14 (see Japanese Utility Model Application Laid-Open No. 58-158490), free ends of curved elastic pieces 78 abut the peripheral edge of a mounting hole 82 of a bracket 80 so as to urge leg bodies 84 in a withdrawing direction thereof. The retainer 76 can conform to changes in the thickness of the bracket 80. Further, in order to conform to changes in the diameter of the mounting hole 82, hollow portions 86 are formed at the inner sides of the leg bodies 84 so that the distance between the leg bodies 84 can be elastically increased and decreased.

However, in this type of retainer 76, distal ends of the elastic pieces 78 catch on the bracket 80 so that it is difficult to incline the leg bodies 84.

Due to this drawback, it is also considered to use a structure of a wiring clamp 88 shown in FIG. 15 (see Japanese Utility Model Application Publication No. 55-54125). Here, the thickness of leg piece 92, in which a penetrating hole 90 is formed along an axial center thereof, is thin, and by deforming the leg piece 92 itself, the wiring clamp 88 is inclined.

However, when the leg piece 92 is thin, the leg piece 92 is easily withdrawn from the bracket 80. Moreover, since swelling portions 92A are engaged with the edge of the mounting hole 82, when the inclination is repeatedly effected, the swelling portions 92A are scraped and the leg piece 92 is thereby withdrawn from the bracket 80.

With the aforementioned in view, an object of the present invention is to provide an engaging structure of a retainer which can conform to changes in the thickness of the mounting plate and changes in the diameter of the mounting hole. In addition, the anchor portion of the retainer can be inclined and is not withdrawn from the mounting hole.

SUMMARY OF THE INVENTION

The first aspect of the present invention is an engaging structure of a retainer which engages the retainer including retaining means with a mounting hole formed at a mounting plate, comprising: leg bodies which extend from a main body, at which the retaining means is formed, substantially parallel to each other with a gap between the leg bodies; an anchor portion which connects distal ends of the leg bodies and which is tapered; pawl pieces which project from a base end of the anchor portion, which has passed through the mounting hole, in a direction of separating from each other, distal ends of the pawl pieces elastically abutting a back surface of the mounting plate, and when the force which pulls the anchor portion out of the mounting hole acts on the pawl pieces, the pawl pieces are pressed and expanded outwardly at a peripheral edge of the mounting hole so as to plane-contact the back surface of the mounting plate; and urging means which projects from the outer surfaces of the leg bodies, distal ends of the urging means being elastically contacted with the surface of the mounting plate.

In the engaging structure of the retainer of the above-described aspect, the leg bodies extend outwardly from the main body at which the retaining means is provided. The leg bodies extend substantially parallel to each other with the gap therebetween. The distal ends of the leg bodies are tapered and connected so as to form the anchor portion. The base end of the anchor portion is an engaging portion which is engaged with the peripheral edge of the mounting hole. Further, from the base end of the anchor portion, the pawl pieces project outwardly in the direction of separating from each other.

When the anchor portion is press-fitted into the mounting hole, it penetrates by narrowing the interval of the gap. After the penetration, the anchor portion elastically returns to its original shape and the diameter thereof increases. The distal ends of the pawl pieces elastically abut the back surface of the mounting plate. At this time, portions of the leg bodies, which are retained in the mounting hole, elastically return to their original shapes so as to press and contact the surface of the mounting plate at the edge of the mounting hole. Accordingly, the main body is engaged with the mounting plate.

Moreover, the distal ends of the urging means, which are projected from the outer surfaces of the leg bodies, elastically abut the surface of the mounting plate and urge the anchor portion in the withdrawing direction thereof. Therefore, the engaging structure can correspond to changes in the thickness of the mounting plate.

When the main body is inclined in this engaged state, the gap formed between the leg bodies facilitates the inclination of the leg bodies. In addition, against the force which pulls the anchor portion out of the mounting hole due to the inclination, the pawl pieces are pressed and expanded outwardly from the peripheral edge of the mounting hole so as to widely contact the back surface of the mounting plate. The withdrawal of the anchor portion is thereby prevented. Further, when the main body is inclined, the urging means is elastically deformed. Therefore, the urging means does not stretch to prevent the inclination of the leg bodies.

In the engaging structure of the retainer of the first aspect, the second aspect of the present invention is an engaging structure of a retainer, wherein the urging means is formed by elastic plates, the elastic plates diagonally project from the outer surfaces of the base portions of the leg bodies in a direction of separating from each other, intermediate portions of the elastic plates are bent, distal end portions of the elastic plates extend toward the leg bodies so as to elastically contact the surface of the mounting plate.

In this aspect, the elastic plates serving as urging means diagonally project from the outer surfaces of the base portions of the leg bodies in the direction of separating from each other, and the distal ends of the elastic plates elastically abut the surface of the mounting plate.

Here, if the thickness of the mounting plate is large, the distal ends of the elastic plates are strongly pressed to the surface of the mounting plate so as to receive large reaction force thereof, and the intermediate portions of the elastic plates are pressed and expanded in the separating direction while the intermediate portions thereof are bent. Accordingly, the force which outwardly stretches the outer surfaces of the leg bodies acts on the root portions of the elastic plates so that the diameters of the leg bodies increase. Therefore, even if the diameter of the mounting hole is large, the diameters of the leg bodies retained in the mounting hole and those of the engaging portions of the anchor portion increase, so that the leg pieces are pressed and contacted with the inner side of the wall of the mounting hole. The engaging structure can thereby correspond to changes in the diameter of the mounting hole.

In the engaging structure of the retainer of the above-described second aspect, the third aspect of the present invention is an engaging structure of a retainer, wherein areas of the leg bodies which are retained within the mounting hole and base portions of the leg bodies are thin compared to the other ares of the leg bodies.

In the engaging structure of the retainer of this aspect, the outer surfaces of the leg bodies can be pulled outwardly by a small force and the diameters of the areas of the leg bodies retained in the mounting hole can easily increase. Therefore, the engaging function improves.

The fourth aspect of the present invention is a retainer which includes a retaining portion, which retains a member to be retained, and which retains the member to be retained at a mounting plate by engaging the retaining portion with a mounting hole formed at the mounting plate, comprising: a pair of leg bodies which extend from one end portion of an elongated and substantially plate-shaped main body, at which the retaining portion is formed, in the longitudinal direction of the main body, the pair of leg bodies being substantially parallel so as to oppose each other with a gap between the leg bodies; an anchor portion which connects distal ends of the pair of leg bodies and which is tapered; pawl pieces which project from a base end of the anchor portion, which has passed through the mounting hole, in a direction of separating from each other, distal ends of the pawl pieces elastically abutting a back surface of the mounting plate, so that the pawl pieces gradually separate from the main body in a longitudinal proximal end direction of the main body, and when the force which pulls the anchor portion out of the mounting hole acts on the pawl pieces, the pawl pieces are pressed and expanded outwardly at a peripheral edge of the mounting hole so as to plane-contact the back surface of the mounting plate; and urging means which projects from the outer surfaces of the leg bodies, distal ends of the urging means being elastically contacted with the surface of the mounting plate.

DESCRIPTION OF THE PREFERRED EMBODIMENTS

Figure 1:
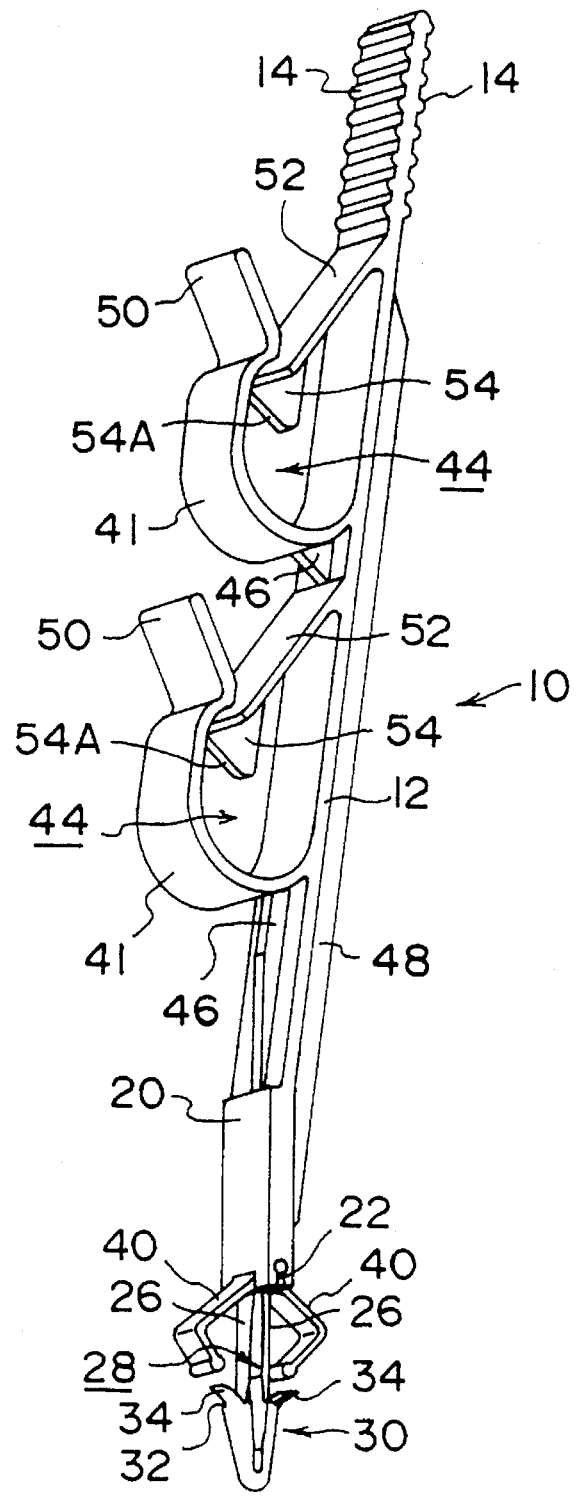
FIG. 1 its an overall perspective view of a coil clamp relating to the present embodiment.
Figure 2:
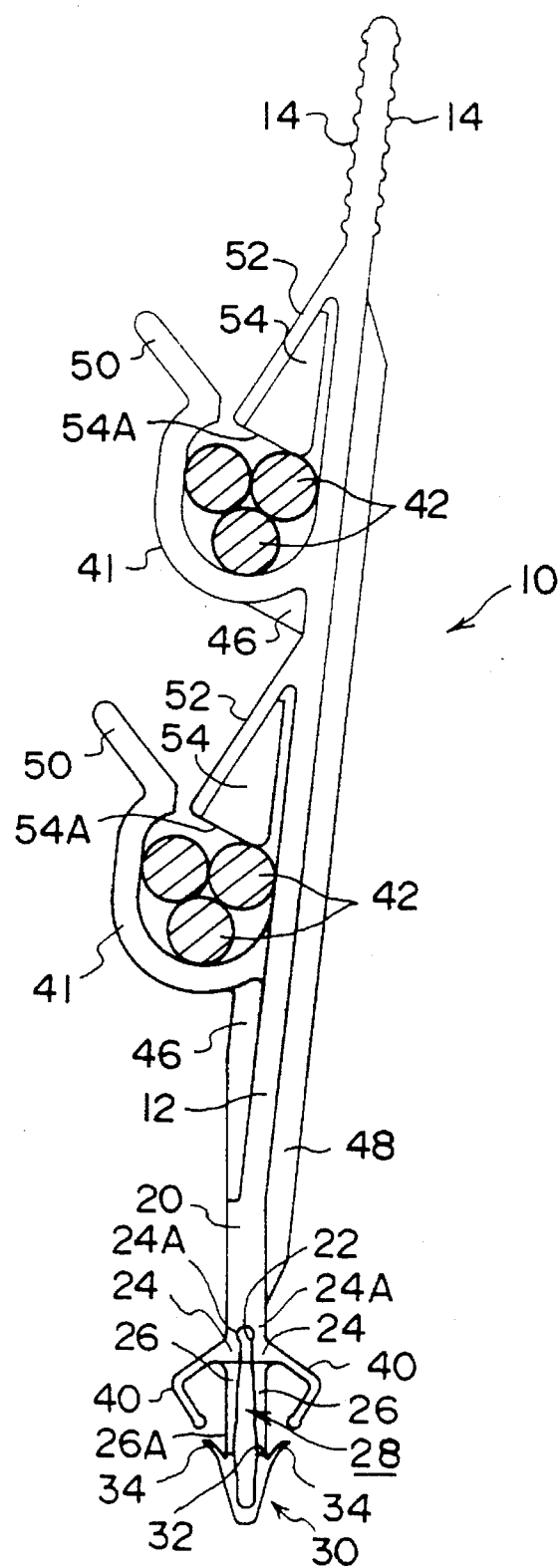
FIG. 2 is a front view of the coil clamp relating to the present embodiment in a state in which the coil clamp retains a degaussing coil.
Figure 3:
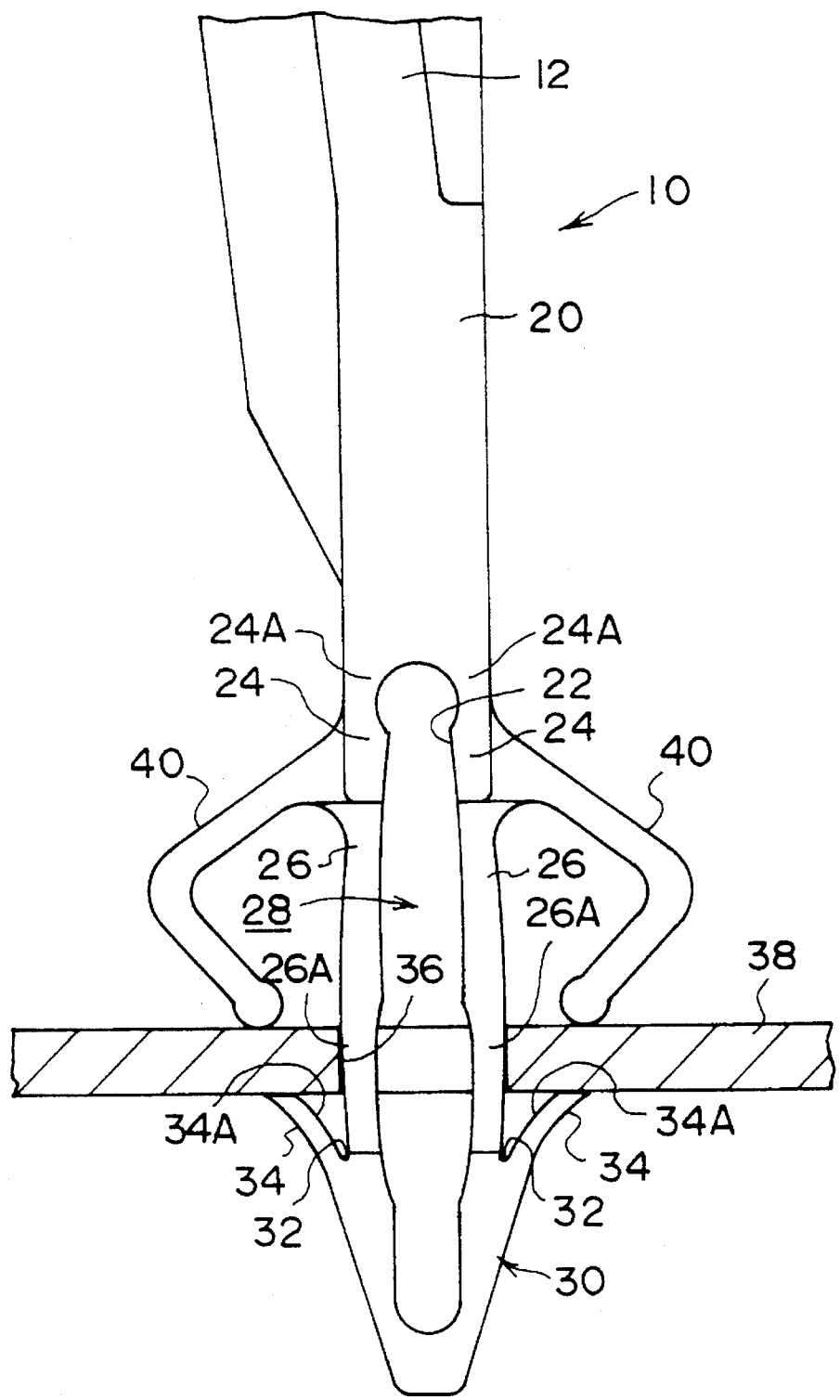
FIG. 3 is a front view of the coil clamp relating to the present embodiment in a state in which the coil clamp is engaged with a mounting hole.

A description will be given of a case in which an engaging structure of a retainer relating to the present embodiment is applied to an engaging portion of a coil clamp 10 shown in FIGS. 1 through 3.

The coil clamp 10 is provided with a flexible, elongated, thin plate-shaped frame 12. Transverse, or widthwise, groove portions 14, which have a plurality of nonslip transverse grooves which are substantially parallel to each other, are formed on both surfaces of the proximal end portion of the frame 12. The transverse groove portions 14 are nipped by fingers, and a distal end side of the frame 12 is inserted through a gap between a housing 16 and a cathode-ray tube 18 (see FIG. 7). This coil clamp can be integrally formed by a flexible material such as resin.

At a distal end side of the frame 12, a thick plate-shaped portion 20 is formed. At the end surface of the plate-shaped portion 20, a groove 22 is formed along the transverse direction of the frame 12. The bottom of the groove 22 is wider than the width thereof and the groove 22 is cut in the form of an arc. The bottom sides of the remaining groove walls 24 are thin-walled portions 24A.

From the top center of the groove walls 24, narrow leg pieces 26 are extended outwardly from the bottom walls 24 substantially parallel to each other and form an elongated, or lengthwise, gap 28 therebetween. The widths of the distal end portions of the leg pieces 26 are slightly increased and are gradually narrowed towards the distal end of the frame 12. Overall, the distal end portions of the leg pieces 26 are tapered and connected so as to form an anchor portion 30.

Figure 8:
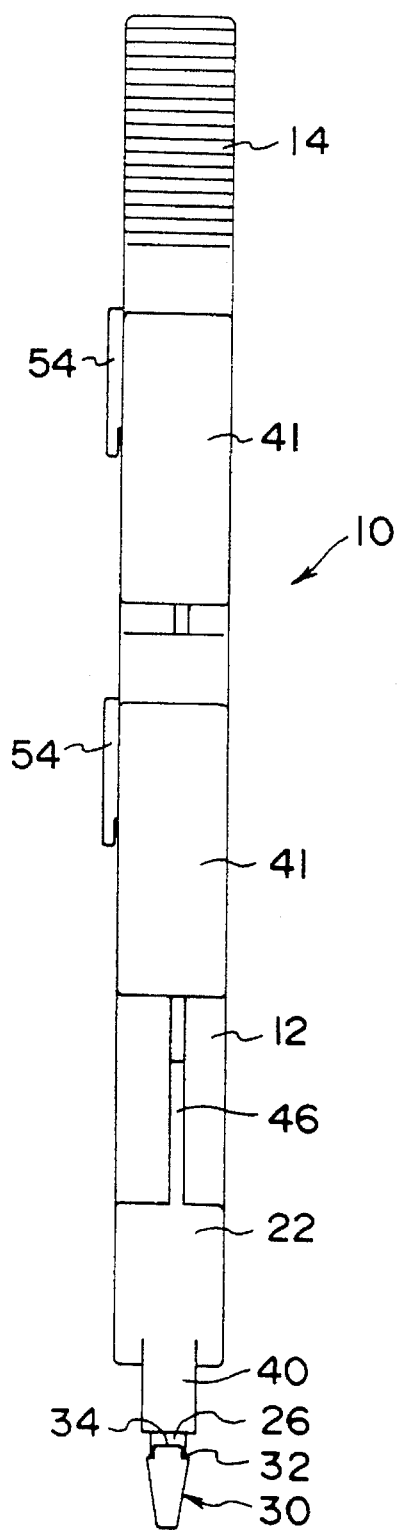
FIG. 8 is a side view of the coil clamp relating to the present embodiment.
Figure 9:
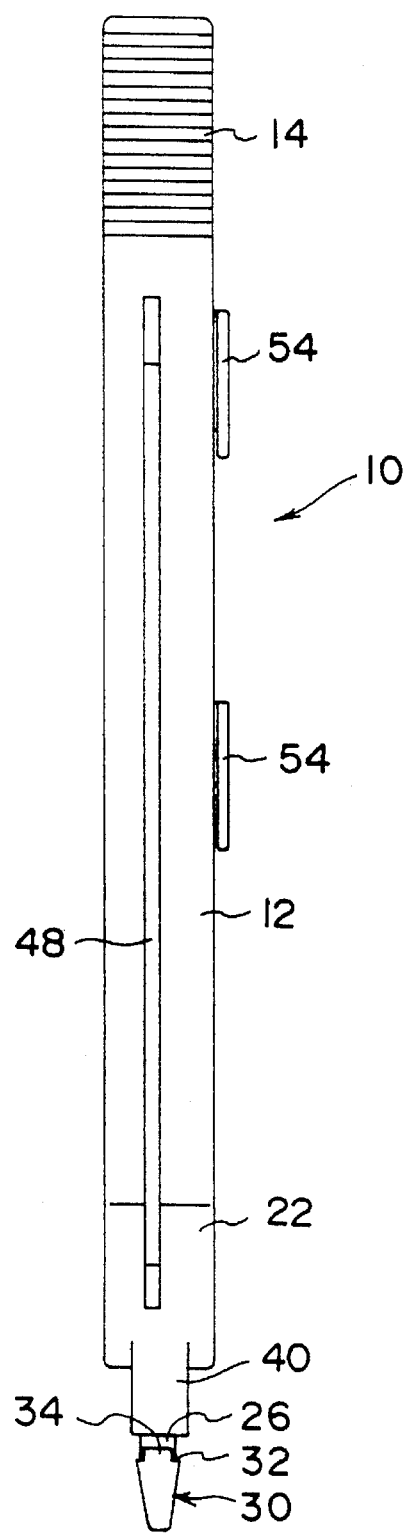
FIG. 9 is a side view of the coil clamp relating to the present embodiment.
Figure 10:
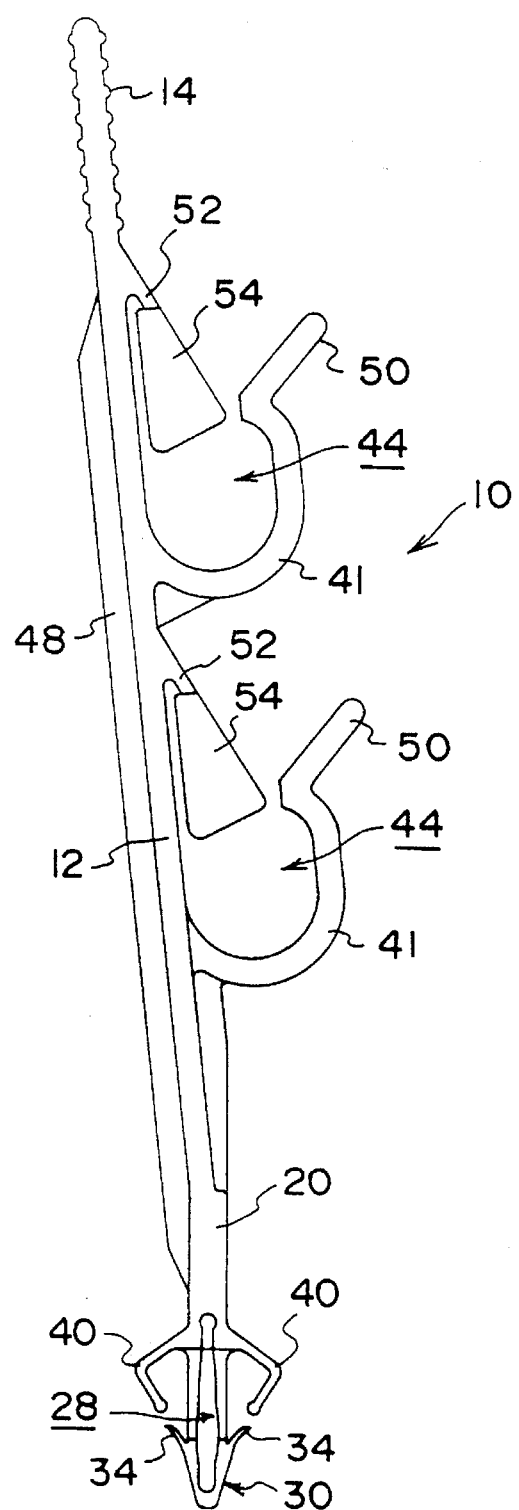
FIG. 10 is a front view of the coil clamp relating to the present embodiment.
Figure 11:
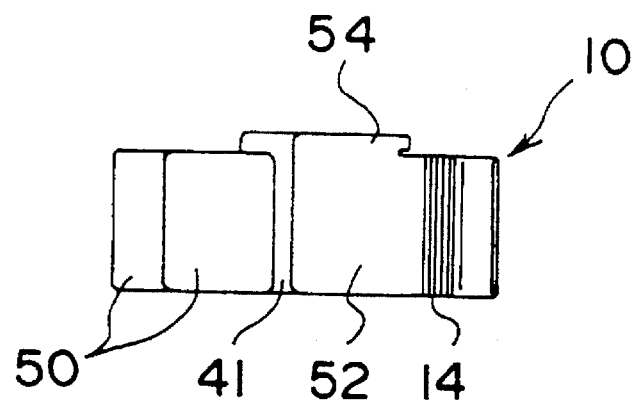
FIG. 11 is a plan view of the coil clamp relating to the present embodiment.
Figure 12:
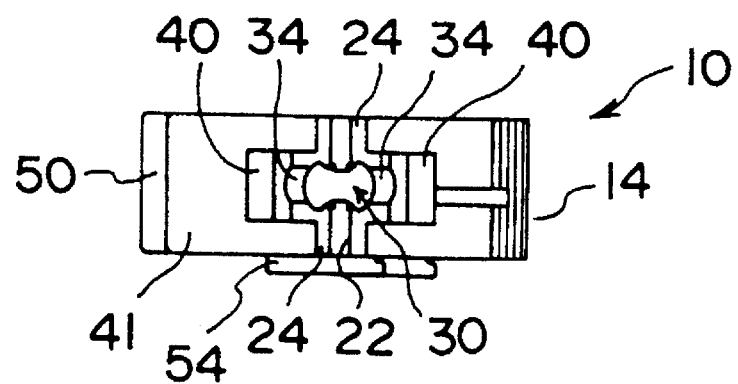
FIG. 12 is a bottom view of the coil clamp relating to the present embodiment.

The outer surface of the anchor portion 30 is gradually thickened towards the proximal end sides of the leg pieces 26 so as to form engaging portions 32, which are engaged with the peripheral edge of the mounting hole 36, at the end of the leg pieces 26 (see FIGS. 8 and 9). As illustrated in FIG. 2, the groove walls 24 and the leg pieces 26 form a leg body. From the engaging portions 32, pawl pieces 34, which are slightly narrower than the engaging portions 32, diagonally project with respect to the leg pieces 26 in the direction of separating from each other. Accordingly, the overall contour of the leg pieces 26 and the anchor portion 30 is formed so as to be substantially shaped as an arrow.

When the anchor portion 30 is press-fitted into the mounting hole 36, the interval of the gap 28 is elastically narrowed so that the press-fitting becomes easy. In addition, because the distal end portions of the anchor portion 30 are connected, the range over which the diameter of the anchor portion 30 reduces is kept constant. Further, when the anchor portion 30 is press-fitted into the mounting hole 36, the interval between the thin-walled portions 26A of the leg pieces 26 reduces. After the anchor portion 30 has passed through the mounting hole 36, the pawl pieces 34 elastically return to their original shapes so that the distal ends of the pawl pieces 34 elastically contact the back surface of the bracket 38.

Further, compared to the other portions of the leg pieces 26, the portions of the leg pieces 26, which are retained in the mounting hole 36, are thin-walled portions 26A. Accordingly, the leg pieces 26 are flexible and the interval thereof can easily increase and decrease.

On the other hand, from the outer surfaces of the groove walls 24, elastic plates 40 diagonally project toward the distal ends of the leg pieces 26 in the direction of separating from each other. At the intermediate portions, the elastic plates 40 bend toward the leg pieces 26. The distal ends of the elastic plates 40 oppose free ends of the pawl pieces 34 at a predetermined interval (the interval which is slightly smaller the minimum thickness of the bracket 38 to be used).

The cross-sectional configuration of the distal end portions (the free ends) of the elastic plates 40 is substantially formed in the shape of an arc. When the anchor portion 30 is inserted through the mounting hole the arc-shaped distal end portions of the elastic plates 40 elastically contact the surface of the bracket 38 so as apply to the anchor portion 30 the force which withdraws the anchor portion 30. At the same time, the force which outwardly presses and expands the groove walls 24 generates so that the interval between the thin-walled portions 26A of the leg pieces 26, which are retained in the mounting hole 36, increases. Namely, when the withdrawing force acts on the anchor portion 30, a pair of pawl pieces 34 press the back surface of the bracket 38 so as to be separate from each other. Due to the separation of the pawl pieces 34, the thin-walled portions 26A are pulled by the pawl pieces 34 so as to enlarge the gap 28.

On the other hand, at the central portion of the frame 12, two arc-shaped clamp plates 41 project outwardly at a predetermined interval so as to respectively form a retaining space 44, which retains degaussing coils 42 between the clamp plate 41 and the side surface of the frame 12.

At the base end portion of the clamp plate 41, stay plate 46 is provided and is connected to the frame 12. On the surface opposite the frame 12, at which the clamp plate 41 is provided, an elongated stay plate 48 is provided along the longitudinal direction of the frame 12 and is used for reinforcing the rigidity of the frame 12.

On the other hand, from the free end of the clamp plate 41, a guide piece 50, which inclines in the direction of separating from the frame 12, extends outwardly. Moreover, from the frame 12, a pressing plate 52 diagonally extends toward the frontage of the retaining space 44. As shown in FIG. 2, a V-shaped guide portion, which guides the degaussing coils 42 into the retaining space 44, is formed by the pressing plate 52 and the guide piece 50.

Further, at the end surface of the pressing plate 52 in the transverse direction thereof, a triangular plate 54 is provided so as to close a portion of the triangular gap formed by the pressing plate 52 and the frame 12.

Next, the operation of the coil clamp 10 relating to the present embodiment will be explained.

Figure 7:
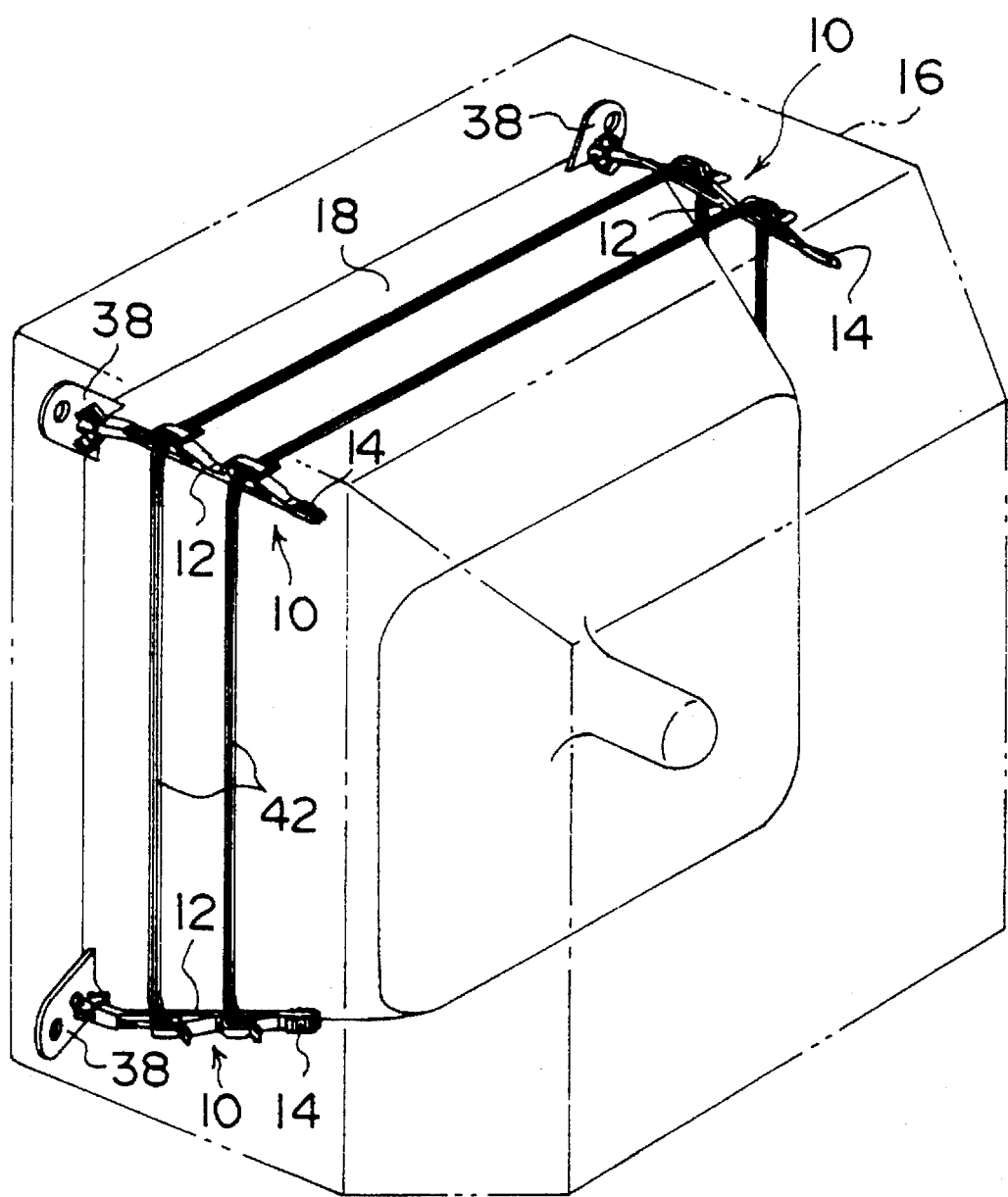
FIG. 7 is a schematic view of the coil clamp relating to the present embodiment in the state in which the coil clamp is used.

First, the transverse groove portions 14 of the coil clamp 10 are nipped by fingers, and through the gap between the housing 16 and the cathode-ray tube 18, the anchor portion 30 is press-fitted into the mounting hole 36 punched at the bracket 38 (see FIG. 7). When the anchor portion 30 passes through the mounting hole 36 while decreasing the diameter thereof, the anchor portion elastically returns to its original shaper so that the engaging portions 32 of the anchor portion 30 and the pawl pieces 34, which are projected outwardly from the engaging portions 32, are engaged with the peripheral edge of the mounting hole At this time, the distal ends of the elastic plates 40 elastically contact the surface of the bracket 38 so as to withdraw the anchor portion 30 by the urging force of the elastic plates 40. Accordingly, the engaging portions 32 and the pawl pieces 34 are strongly pressed by the peripheral edge of the mounting hole 36. The coil clamp 10 is engaged with the bracket 38 without moving with play.

Figure 4:
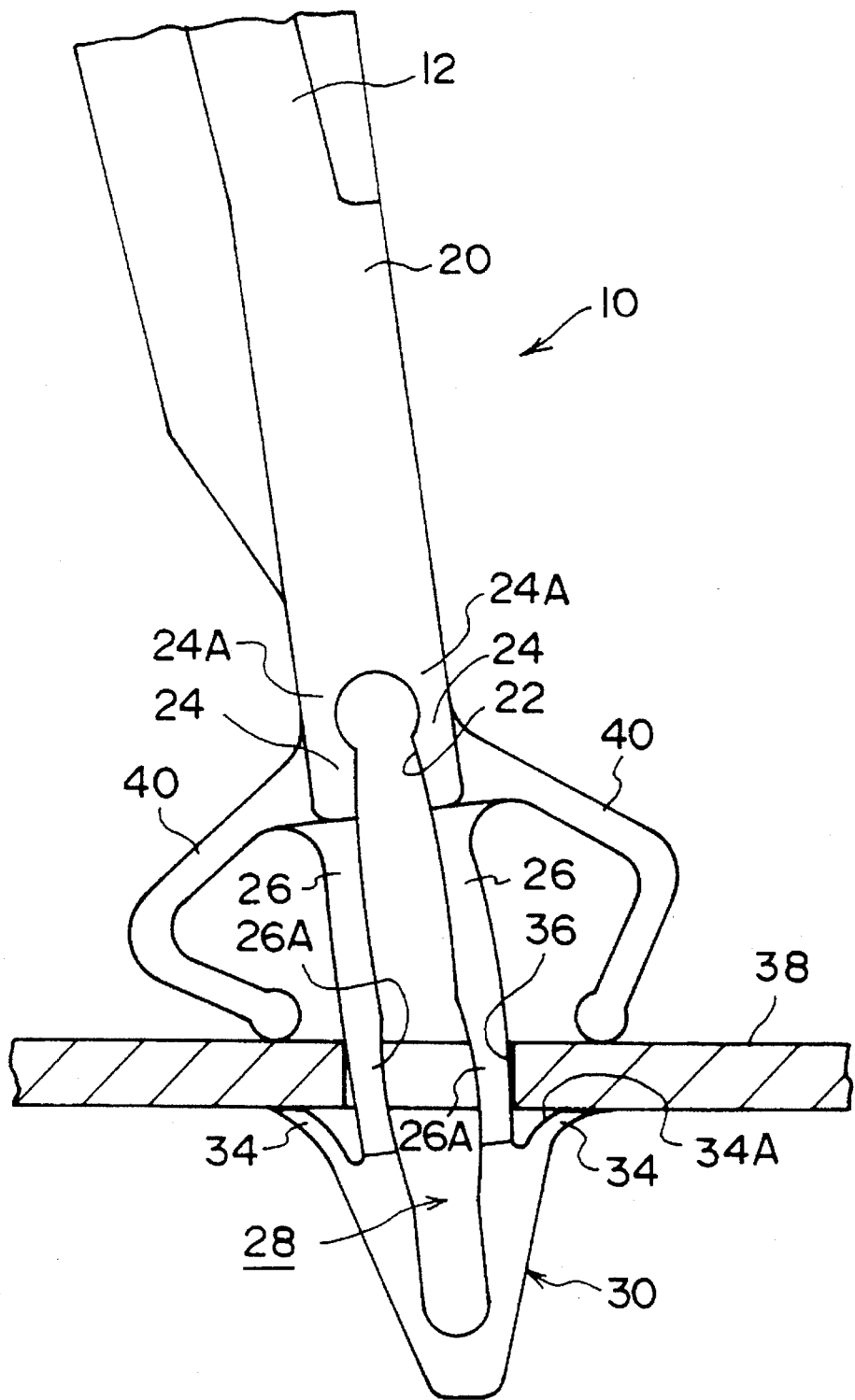
FIG. 4 is a front view of the coil clamp relating to the present embodiment in a state in which the coil clamp is engaged with the mounting hole and inclined.

Next, the degaussing coils 42 are pressed into the retaining space 44 formed by the clamp plate 41 and the frame 12 while the degaussing coils 42 are wound around the outer peripheral surface of the cathode-ray tube 18. When the degaussing coils 42 are pressed into the retaining space 44, the coil clamp 10 needs to be inclined so as to facilitate the pressing of the degaussing coils 42 into the retaining space 44. Here, as illustrated in FIG. 4, the frame 12 is easily inclined while the leg pieces 26 slightly narrow the width of the gap 28. In addition, since the elastic plates 40 are bent and do not support the frame 12, the frame 12 can be easily inclined.

Moreover, at this time, because one of the pawl pieces 34 (the side on which the inclined force acts) is pressed and expanded, an abdomen portion 34A of the pawl piece 34 is fit to the back surface of the bracket 38, and further, the distal end of the other pawl piece 34 presses the back surface of the bracket 38. The withdrawal of the anchor portion 30 is prevented.

Further, since the degaussing coils 42 are prevented by the end portion 54A of the triangular plate 54 from entering into the triangular gap formed between the pressing plate 52 and the frame 12, the position around which the degaussing coils 42 are wound does not deviate and the degaussing coils 42 can be secured at a predetermined position.

Figure 5:
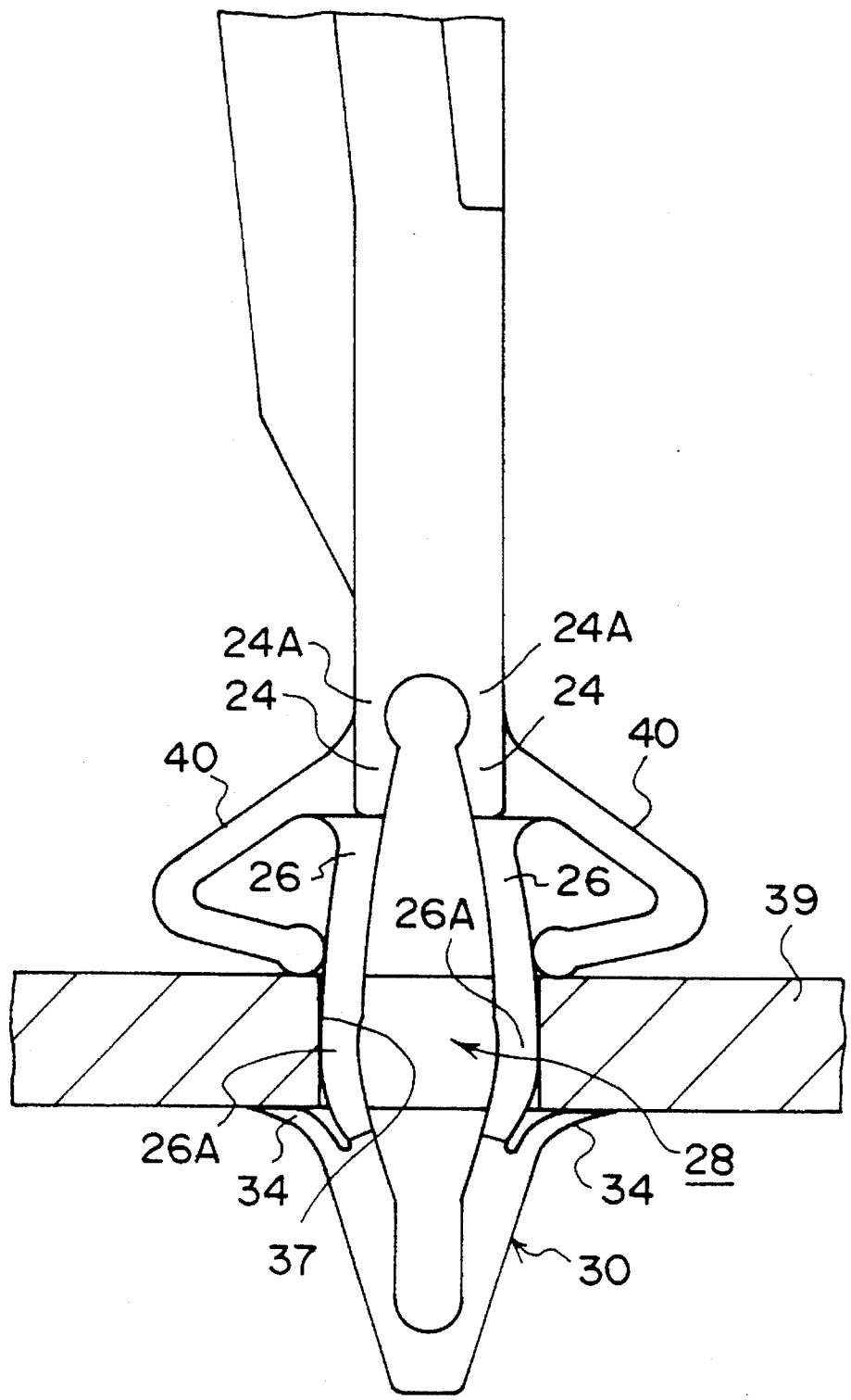
FIG. 5 is a front view of the coil clamp relating to the present embodiment in a state in which the coil clamp is engaged with a bracket which is thick and has a large diameter.

As shown in FIG. 5, even in a case in which the thickness of a bracket 39 is large and the diameter of a mounting hole 37 is large, the elastic plates 40 are bent largely so as to withdraw the anchor portion 30 by the urging force of the elastic plates 40. At the same time, the large force which outwardly presses and expands the groove walls 24 generates. Accordingly, the diameters of the thin-walled portions 26A of the leg pieces 26, which are retained at the mounting hole 37, are increased so as to correspond to changes in the diameter of the hole.

Figure 6:
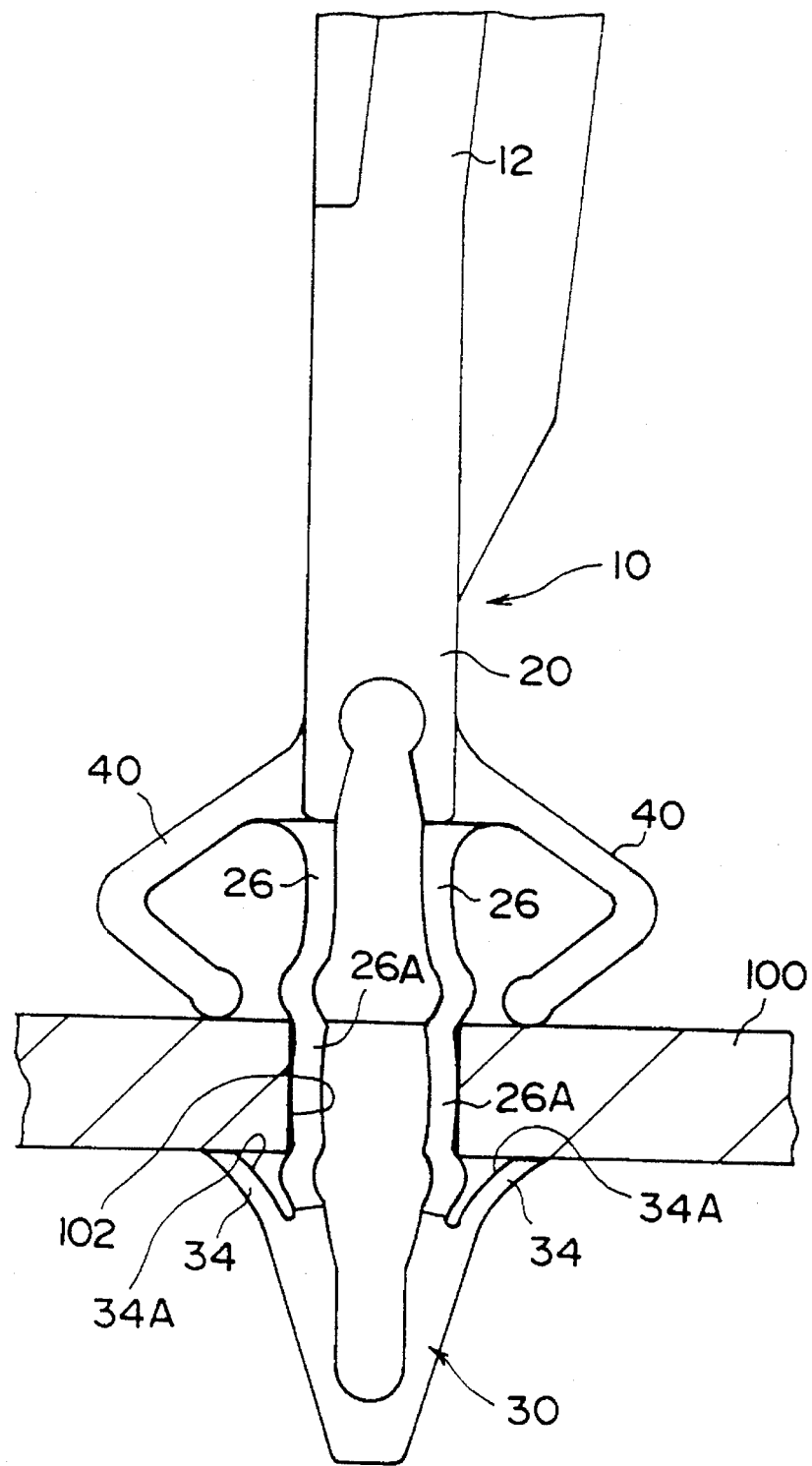
FIG. 6 is a front view of the coil clamp relating to the present embodiment in a state in which the coil clamp is engaged with a bracket which is thick and has a small diameter.

Moreover, as shown in FIG. 6, even in a case in which the thickness of a bracket 100 is large and the diameter of a mounting hole 102 is small, the anchor portion 30 is withdrawn by the urging force of the elastic plates 40, so that the upper and the lower portions of the thin-walled portions 26A, which diameters thereof are reduced so as to correspond to the diameter of the mounting hole 102, rise. In a state in which the inclination is allowed, the thin-walled portions 26A are firmly retained in the mounting hole 102.

Next, a description will be given of a case in which the above-described engaging structure is applied to a cable clamp 60.

Figure 13:
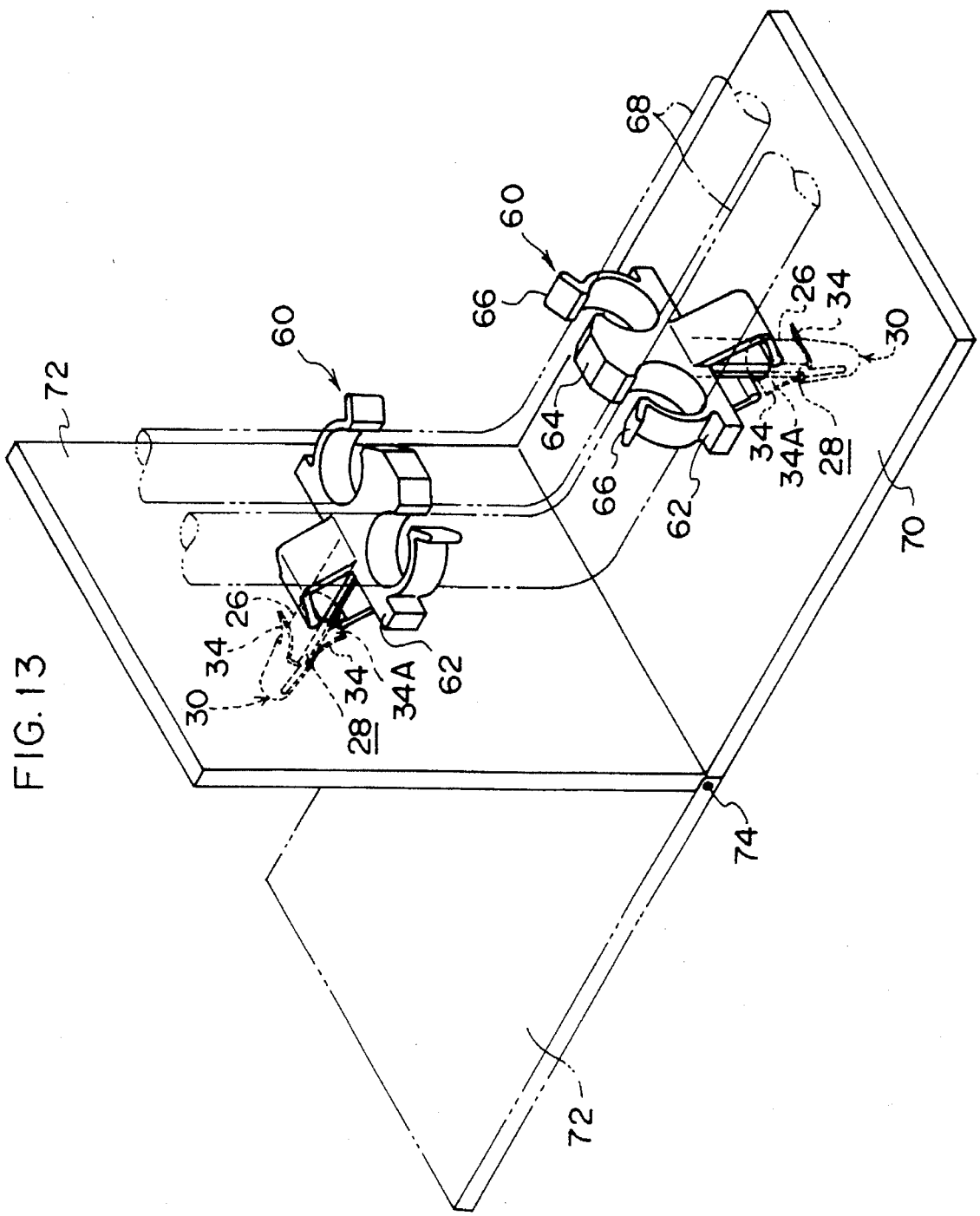
FIG. 13 is a schematic view of a cable clamp relating to the present embodiment in a state in which the cable clamp is used.
Figure 14:
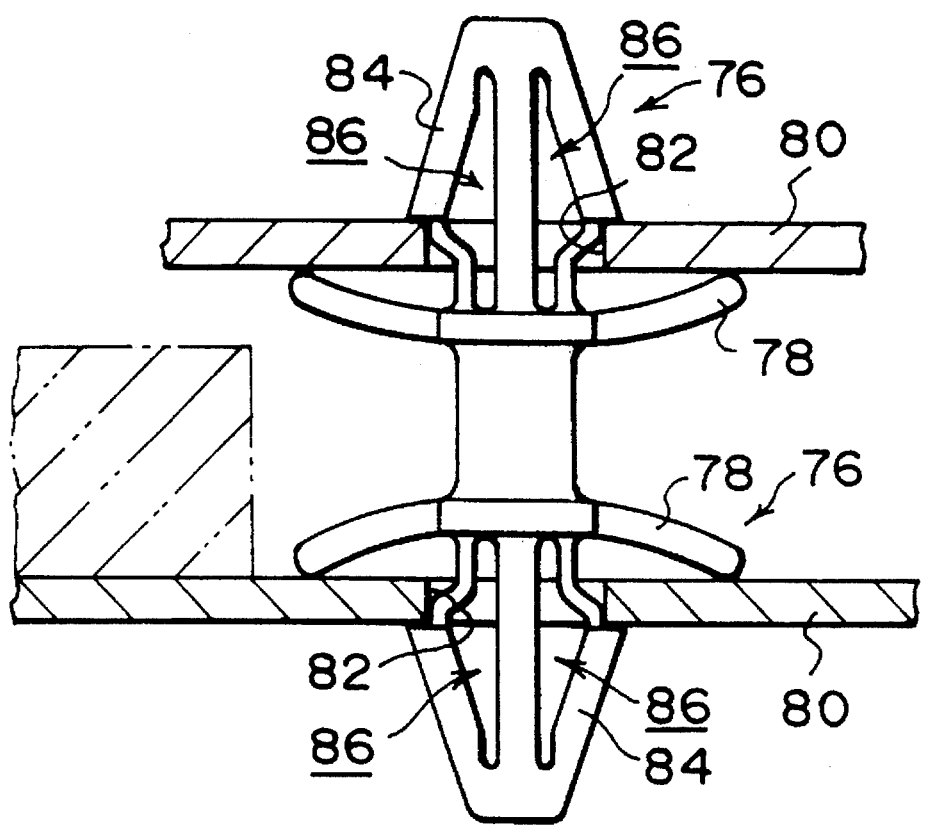
FIG. 14 is a cross-sectional view of a conventional engaging structure.
Figure 15:
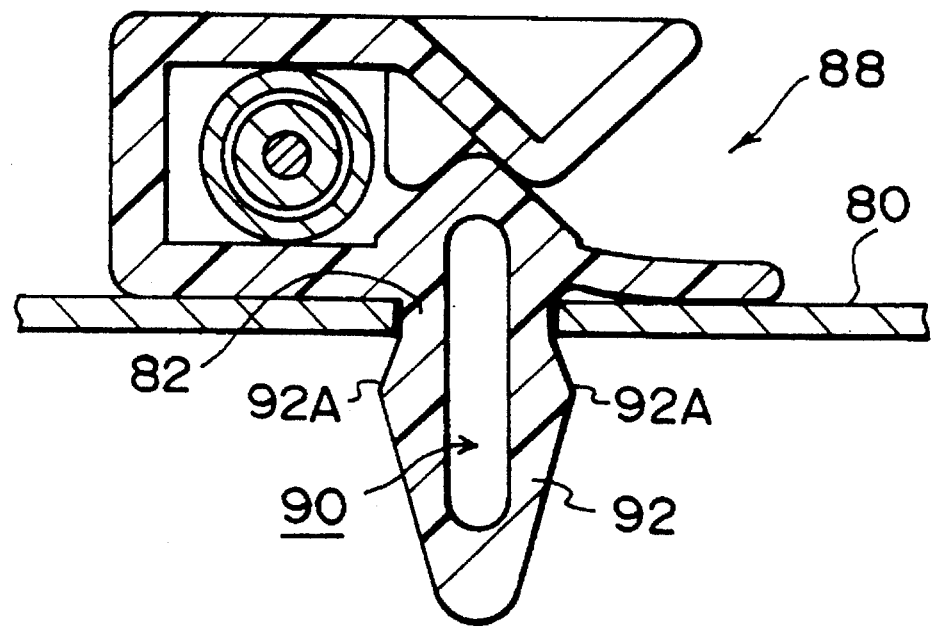
FIG. 15 is a cross-sectional view of a conventional engaging structure.

As illustrated in FIG. 13, the cable clamp 60 is provided with a long plate-shaped base 62. At the central portion of the base 62, a support 64 whose side surfaces are formed in the shape of an arc is provided. On both sides of the support 64, elastic retaining pieces 66 whose inner sides are formed in the shape of an arc are provided so as to oppose the support 64 and form circular spaces with the support 64. The upper portion of the support 64 and the elastic retaining pieces 66 is opened so that cables 68 can be press-fitted thereinto.

The cable clamp 60 is mounted to a mounting plate VO and an opening/closing door 72. The opening/closing door 72 is connected to the mounting plate 70 by hinges 74 so as to be pivotable.

Accordingly, when the opening/closing door 70 is pivoted, the cables 68 also swing. However, by disposing the cables 68 in the swinging direction thereof so as to increase and decrease the gap 28 of the leg pieces 26, the swing is allowed and excessive force does not act on the cables 68. Moreover, because the pawl pieces 34 are pressed and expanded so that the abdomen portion 34A widely abuts the back surfaces of the mounting plate 70 and the opening/closing door 72, the anchor portion 30 is not withdrawn from the mounting plate 70.

The engaging structure of the retainer relating to the present invention is not limited to the above-described coil clamp 10 and the cable clamp 60 and can be applied to any structure provided that the anchor portion thereof is inclined.

Because the present invention is structured as described above, the present invention can conform to changes in the thickness of the mounting plate and changes in the diameter of the mounting hole. Further, the engaging portion of the present invention can be inclined and is not withdrawn from the mounting hole.

What is claimed is:

1. An engaging structure of a retainer for securing the retainer in a mounting hole extending through a mounting plate including front and back surfaces, comprising:

a main body;

leg bodies extending from the main body, said leg bodies being substantially parallel to each other and being separated from each other by a gap, each of said leg bodies having a base end and a distal end;

a tapered anchor portion connecting the distal ends of said leg bodies to each other;

pawl pieces projecting from a base end of said anchor portion in a direction such that the pawl pieces diverge from each other, distal ends of said pawl pieces being adapted to elastically abut the back surface of the mounting plate, such that upon application of a force that is directed to pull said anchor portion out of the mounting hole, said pawl pieces are pressed and expanded outwardly so as to plane-contact the back surface of the mounting plate; and urging means projecting from outer surfaces of said leg bodies, said urging means having distal ends adapted to elastically contact the front surface of the mounting plate.

2. An engaging structure of a retainer according to claim 1, wherein said urging means comprises elastic plates, the elastic plates diagonally projecting from the outer surfaces of the leg portions along said base ends in a direction such that the elastic plates diverge from each other, said elastic plates including intermediate portions that are bent, and distal end portions that extend toward said leg bodies so as to elastically contact the front surface of the mounting plate.

3. An engaging structure of a retainer according to claim 2, wherein said leg bodies include (i) an intermediate section adapted to be retained within the mounting hole, and (ii) a base section along said base end of said leg bodies, wherein said intermediate section and said base section are thin compared to the other sections of said leg bodies.

4. An engaging structure of a retainer according to claim 3, wherein the gap that separates the leg bodies from each other along the base end forms an arc, thereby forming said base section that is relatively thin.

5. An engaging structure of a retainer according to claim 2, wherein each elastic plate has a substantially arcuate cross-section.

6. An engaging structure of a retainer according to claim 2, wherein said leg bodies have a narrowed cross-section along a length thereof.

7. An engaging structure of a retainer according to claim 2, wherein said leg bodies comprise at least one opposing pair of leg bodies.

8. An engaging structure of a retainer according to claim 1, wherein the main body comprises an elongated plate.

9. An engaging structure of a retainer according to claim 8, wherein the main body further comprises first and second retaining means spaced apart from each other along the longitudinal direction of the plate.

10. An engaging structure of a retainer according to claim 9, wherein the retaining means includes substantially arc-shaped clamp portions and pressing portions, the clamp portions are extended from said main body, and the pressing portions are adapted to press a member that passes into the retaining means.

11. A retainer adapted to be secured in a mounting hole extending through a mounting plate, comprising:

a main body comprising an elongated substantially plate-shaped portion and a retaining portion for retaining a member therein; and an engaging structure extending from the main body and being adapted to engage the mounting hole in the mounting plate, said engaging structure comprising (i) a pair of leg bodies extending from the main body, said leg bodies being substantially parallel to each other and being separated from each other by a gap, each of said leg bodies having a base end and a distal end; (ii) a tapered anchor portion connecting distal ends of said leg bodies to each other; (iii) pawl pieces projecting from a base end of said anchor portion in a direction such that the pawl pieces diverge from each other, distal ends of said pawl pieces being adapted to elastically abut the back surface of the mounting plate, such that upon application of a force that is directed to pull said anchor portion out of the mounting hole, said pawl pieces are pressed and expanded outwardly so as to plane-contact the back surface of the mounting plate; and (iv) urging means projecting from outer surfaces of the leg bodies, said urging means having distal ends adapted to elastically contact the front surface of the mounting plate.

12. A retainer according to claim 11, wherein said urging means comprises elastic plates, the elastic plates diagonally projecting from the outer surfaces of the leg portions along said base ends in a direction such that the elastic plates diverge from each other, said elastic plates including intermediate portions that are bent, and distal end portions that extend toward said leg bodies so as to elastically contact the front surface of the mounting plate.

13. A retainer according to claim 12, wherein said leg bodies include (i) an intermediate section adapted to be retained within the mounting hole, and (ii) a base section along said base end of said leg bodies, wherein said intermediate section and said base section are thin compared to the other sections of said leg bodies.

14. A retainer according to claim 13, wherein the gap that separates the leg bodies from each other along the base end forms an arc, thereby forming said base section that is relatively thin.

15. A retainer according to claim 12, wherein each elastic plate has a substantially arcuate cross-section.

16. A retainer according to claim 12, wherein said leg bodies have a narrowed cross-section along a length thereof.

17. A flexible clamp adapted to be secured in a mounting hole extending through a mounting plate, comprising:

a main body comprising an elongated and substantially plate-shaped portion and a retaining portion for retaining an elongated member therein, said retaining portion being integrally formed with said elongated and substantially plate-shaped portion; and an engaging structure extending from the main body and being adapted to engage the mounting hole in the mounting plate, said engaging structure comprising (i) a pair of leg bodies extending from the main body, said leg bodies being substantially parallel to each other and being separated from each other by a gap, each of said leg bodies having a base end and a distal end; (ii) a tapered anchor portion connecting distal ends of said leg bodies to each other; (iii) pawl pieces projecting from a base end of said anchor portion in a direction such that the pawl pieces diverge from each other, distal ends of said pawl pieces being adapted to elastically abut the back surface of the mounting plate, such that upon application of a force that is directed to pull said anchor portion out of the mounting hole, said pawl pieces are pressed and expanded outwardly so as to plane-contact the back surface of the mounting plate; and (iv) elastic plates diagonally projecting from outer surfaces of the leg portions along said base ends, in a direction such that the elastic plates diverge from each other, said elastic plates including intermediate portions that are bent, and distal end portions that extend toward the leg bodies so as to elastically contact the front surface of the mounting plate.

* * * * *